Oct. 15, 1963 J. B. SNOY 3,106,999
HYDRAULICALLY OPERATED CLUTCH MECHANISM
Filed Sept. 12, 1960 3 Sheets-Sheet 1

Inventor.
Joseph B. Snoy.
By
Attorney.

Oct. 15, 1963 J. B. SNOY 3,106,999
HYDRAULICALLY OPERATED CLUTCH MECHANISM
Filed Sept. 12, 1960 3 Sheets-Sheet 2

Inventor,
Joseph B. Snoy.

By
Attorney.

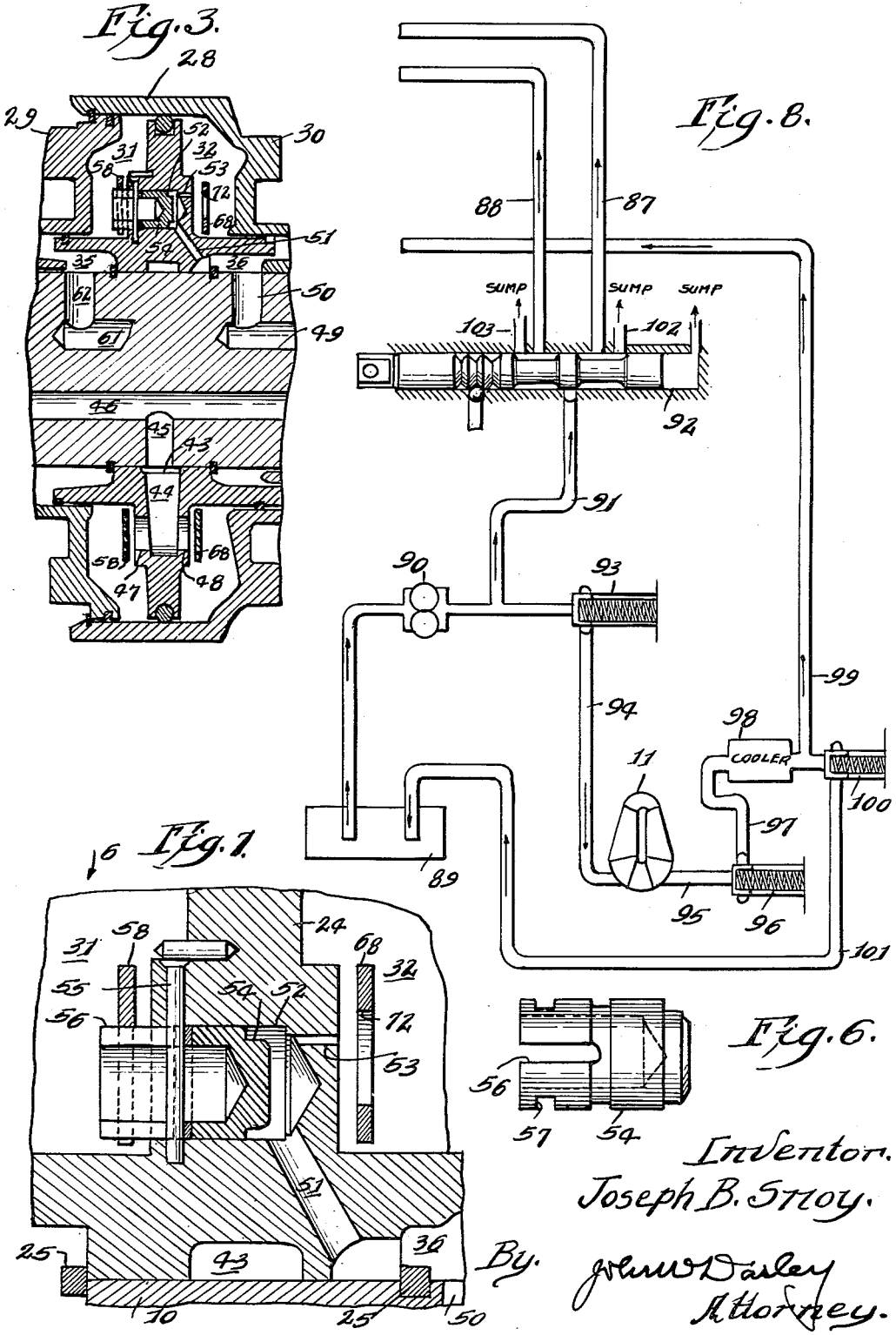

United States Patent Office 3,106,999
Patented Oct. 15, 1963

3,106,999
HYDRAULICALLY OPERATED CLUTCH
MECHANISM
Joseph B. Snoy, Rockford, Ill., assignor to Twin Disc
 Clutch Company, Racine, Wis., a corporation of Wisconsin
Filed Sept. 12, 1960, Ser. No. 55,575
17 Claims. (Cl. 192—87)

My invention relates to hydraulically operated clutch mechanisms and in particular to an arrangement wherein a pair of clutches coaxially positioned in opposed relation are selectively engaged to provide drive through associated gearing or other devices.

One object of the invention is to provide a clutch mechanism of the character indicated wherein the engagement of either clutch is accomplished with rapidity consonant with a substantial cushioned take-up of the load and wherein the pressure liquid chamber associated with each clutch is constantly filled with oil under some regulated pressure.

A further object is the provision of hydraulically controlled means for determining the admission of oil at a basic minimum pressure to both chambers when both clutches are in released positions and selectively an admission of a higher oil pressure to the chamber of the clutch being engaged while maintaining the basic pressure in the chamber of the clutch being released.

A further object is the provision of oppositely acting piston members which are tied together for simultaneous movement and which partly define the clutch chambers, respectively, to thereby counteract the effect of centrifugal force acting on the oil in the chambers.

In the drawings:

FIG. 3 is a fragmentary section of the mechanism as shown in FIG. 1 but taken along the line 3—3 in FIG. 2.

Figure 4:
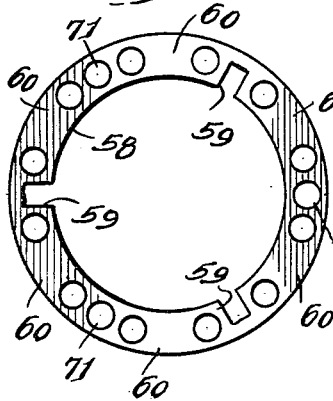
Figure 5:
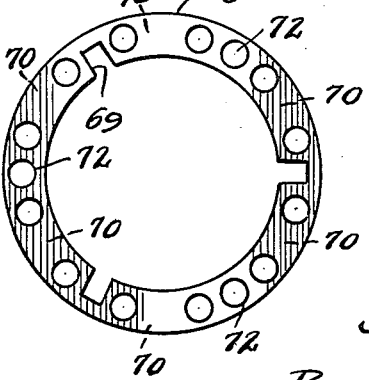

FIGS. 4 and 5 are reduced scale elevations of the valve plates which are hydraulically positioned to determine flow into the clutch chambers and including a closed position for each chamber when the associated clutch is engaged to thereby establish the relatively high pressure reuqired for engagement, the plates being shown in the relative rotarily shifted positions which they occupy in the mechanism.

FIG. 6 is an enlarged elevation of one of the shiftable carriers which support each valve plate as viewed in the direction of the arrow 6 in FIG. 7.

FIG. 7 is an enlarged sectional elevation of the carrier-valve plate assembly as viewed in FIG. 3.

Figure 1:
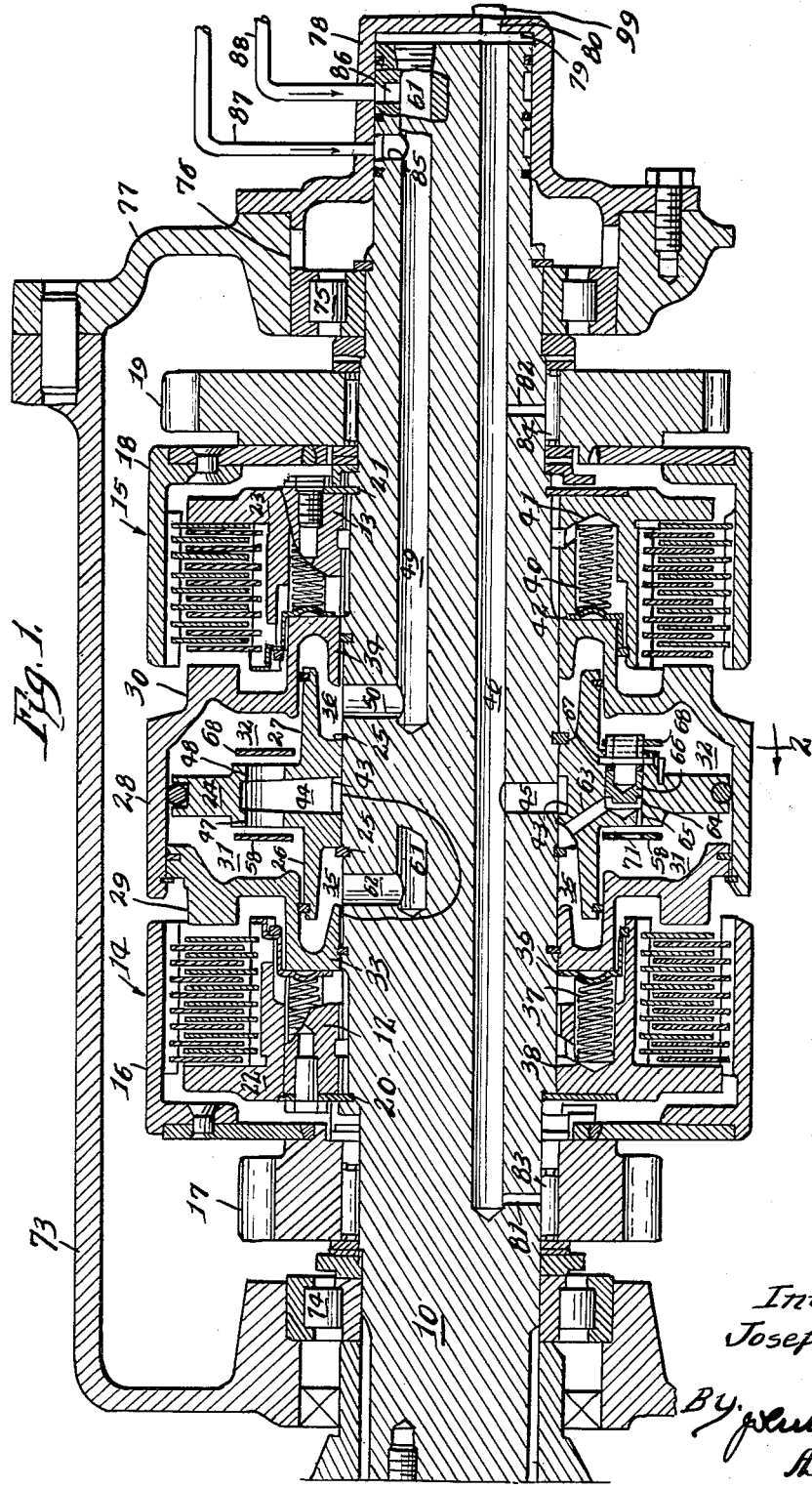
FIG. 1 is a sectional elevation of the clutch mechanism as taken generally along the line 1—1 of the reaction member shown in FIG. 2 which partly defines the pair of clutch chambers, the clutches being shown in release positions.

FIG. 8 is a schematic of the hydraulic circuit for the clutch mechanism and which is to be considered in conjunction with FIG. 1.

Referring to FIG. 1 of the drawings, the numeral 10 designates a shaft which, for purpose of description, will be regarded as the input shaft of the mechanism that may be driven through an hydraulic torque converter 11 (see FIG. 8) by a suitable power source. Keyed to the shaft 10 in spaced relation are hubs 12 and 13 forming parts of friction plate clutches generally denoted by the numerals 14 and 15, respectively. Each clutch includes plates arranged conventionally with alternate plates having toothed driven connection with one member while the intervening plates having toothed driving connection with another member. For the clutch 14, the alternate plates are driven by the hub 12 and the intervening plates drive an annular shell 16 which is fast to a pinion 17 that is journaled on the shaft 10, and for the clutch 15, the alternate plates are driven by the hub 13 and the intervening plates drive an annular shell 18 which is fast to a pinion 19 also journaled on the shaft 10. It will be apparent that the pinions 17 and 19 may be associated with any desired type of gear train for drives either in the same direction at different speeds or for forward and reverse drives.

The clutch hubs 12 and 13 are held against leftward and rightward movements by rings 20 and 21 recessed in the shaft 10 and fastened to the hubs, and the same hubs include rings 22 and 23 which serve as abutments for the plates of the clutches, all respectively.

Annular reaction member 24 surrounds and rotates with the shaft 10 between the clutches 14 and 15 and is held against axial movements by snap rings 25—25 recessed in the shaft 10. The member 24 further includes lateral, oppositely extending, annular flanges 26 and 27 which are coaxial with and spaced from the periphery of the shaft 10 for a purpose presently explained.

Surrounding and axially shiftable relative to the shaft 10 and reaction member 24 is an annular casing 28 including annular end walls which are transverse to the shaft 10 and serve as pistons 29 and 30 that are adapted to engage the clutches 14 and 15, respectively. The pistons 29 and 30 define with the casing 28 and reaction member 24 including the flanges 26 and 27 thereof variable volume, liquid receiving chambers 31 and 32, respectively. Further, the pistons 29 and 30 include offsets 33 and 34 which, in conjunction with the shaft 10, define with the reaction member flanges 26 and 27 variable volume, liquid receiving chambers 35 and 36, respectively. Suitable seals are provided in required locations to retain the working liquid in the several chambers.

In the clutch release positions shown in FIG. 1, the casing 28 including its pistons 29 and 30 and offsets 33 and 34 is biased to a midway position between the clutches 14 and 15 by the following instrumentalities. A plurality of springs 37 is circumferentially spaced around and mounted in pockets 38 provided in the hub 12 and their free ends constantly bear against a slidable retaining ring 39, carried by the hub 12, and which abuts the offset 33. Similarly, a plurality of springs 40 is circumferentially spaced around and mounted in pockets 41 provided in the hub 13 and the free ends of the springs 40 constantly bear against a slidable retaining ring 42, carried by the hub 13, and which abuts the offset 34.

Figure 2:
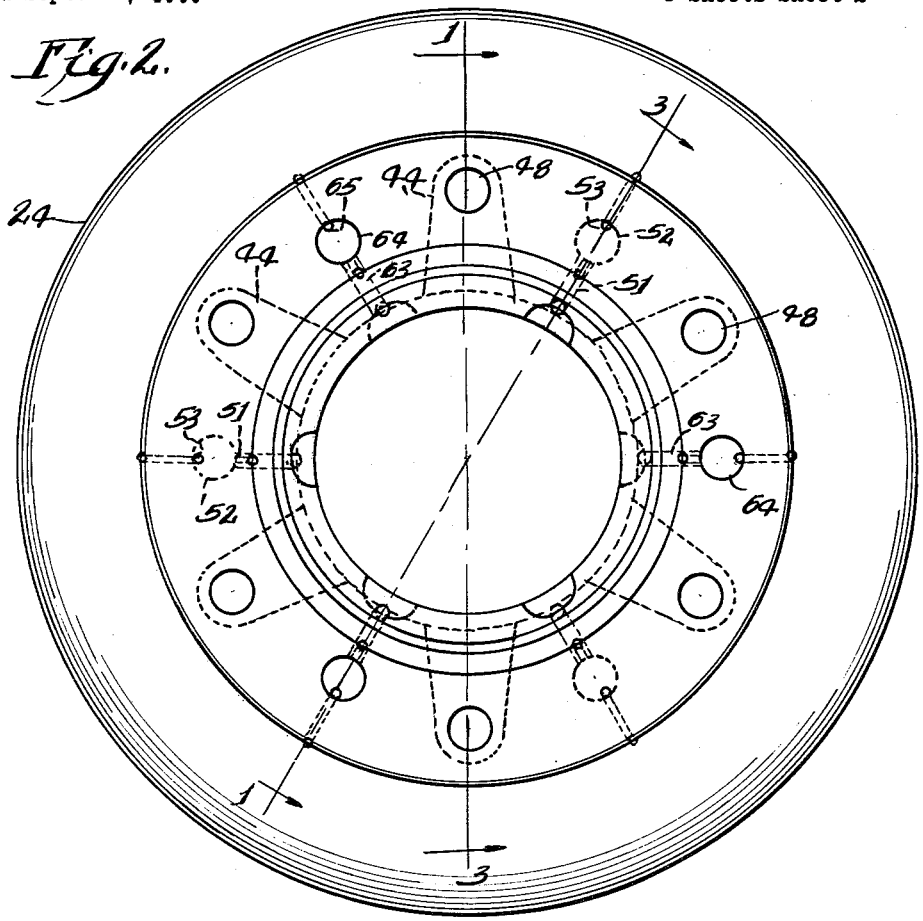
FIG. 2 is an enlarged end view of the reaction member looking in the direction of the arrow 2 in FIG. 1, the carrier-valve plate assembly being omitted.

Referring to FIGS. 1, 2 and 3, the reaction member 24 includes an annular channel 43 which provides constant communication between a plurality of equispaced radial pockets 44 in the reaction member 24 and connecting radial and longitudinal passages 45 and 46, respectively, in the shaft 10. Each pocket 44 is communicable through lateral passages 47 and 48 in the reaction member 24 with the chambers 31 and 32, respectively, and it is through the pockets 44 and passages 47 and 48 that the relatively low pressure liquid, actually a suitable oil so referred to hereinafter, is supplied to the chambers 31 and 32 as subsequently described more in detail.

To supply the relatively high pressure oil to the chambers 31 and 32 as selected to engage the associated clutch while at the same time accommodating discharge of oil from the decreasing volume chamber of the clutch being released, the following arangement is provided. Considering supply to the chamber 32 (see FIGS. 1, 3 and 7), one end of a longitudinal passage 49 connects with a radial passage 50, both of these passages being formed within the shaft 10. The passage 50 connects with the chamber 36 and thence through a plurality of passages 51 in the reaction member 24 with a plurality of cylindrical recesses 52, respectively, equispaced around the reaction member, each recess being closed at the end adjacent the chamber 32, except for a metering passage 53 which constantly connects this chamber with the recess 52, and is open to the chamber 31 at the opposite end.

A piston carrier 54 is shiftable endwise in each recess 52 and the left end thereof, as viewed in FIG. 7, extends into the chamber 31, while its right end is exposed either to high or sump pressure oil depending upon the conditions of operation as presently described. In any endwise position of the carrier 54, it never masks the associated passage 51. The carrier 54 is held against rotation and is limited in its endwise movements towards the left by a pin 55 carried by the reaction member 24 and which extends through an open end, longitudinal slot 56 provided in the carrier 54, the open end of the slot 56 facing the chamber 31. The carrier 54 is additionally provided with diametrally related, chordal slots 57—57 formed in the periphery of the carrier at a spacing of 90°, respectively, from the slot 56. Collectively, the carriers 54 form a set for supporting an annular valve plate 58 (see FIG. 4). Assuming the use of three carriers 54, the valve plate 58 is slotted in three equispaced locations outwardly from the inner periphery thereof for a predetermined distance as indicated by the numeral 59 and the outwardly extending walls of the slots 59 interfit the chordal slots 57 in the carrier 54, respectively, so that the valve plate 58 and associated carriers 54 move as a unit. While the valve plate 58 is apertured in a number of locations, certain of these apertures are provided only for weight reduction and to insure free flow of the oil and need not be identified, but other apertures in the plate 58 have functional value and will be referred to hereinafter. However, it will be noted by comparing FIG. 4 with FIG. 1 that spaced solid portions 60 of the valve plate 58 register with the passages 47 that connect with the several pockets 44 and so provide a means for controlling flow through the passages 47.

For high pressure supply to the chamber 31 and referring to FIG. 1, one end of a longitudinal passage 61 connects through a radial passage 62 with the chamber 35, it being understood that the longitudinal passages 49 and 61 are suitably spaced in the shaft 10. The chamber 35 connects through a plurality of passages 63 in the reaction member 24 with a plurality of cylindrical recesses 64, respectively, that are equispaced around the reaction member and in alternating relation to the recesses 52, each of the recesses 64 being closed at the end adjacent the chamber 31 except for a metering passage 65 which has functional similarity to the metering passage 53 (see FIG. 7). The opposite ends of the recesses 64 are open to the chamber 32.

From the foregoing, it will be apparent that the two sets of recesses 52 and 64 face in opposite directions. Slidably mounted in each recess 64 is a piston carrier 66 identical with the carrier 54 and conditioned for endwise movement only by a pin 67 and limited thereby in one direction in the same manner as indicated for the carrier 54 in FIG. 7. Within the chamber 32, the exposed ends of the carriers 66 support an annular valve plate 68 which includes equispaced slots 69 similar to the slots 59 in the valve plate 58, the former slots interfitting with the carriers 66 in the same manner as shown in FIG. 7.

The valve plates 58 and 60 are identical, but the alternating relation of their respective carriers 54 and 66 places the plates in the general relative positions shown in FIGS. 4 and 5, it being assumed that the face of the valve plate 58 as it appears in FIG. 4 will be in opposed relation to the reverse side of the valve plate 68 as it appears in FIG. 5. The valve plate 68 is also apertured partly for the reasons specified for the valve plate 58 and the important apertures will be presently identified.

The solid portions 70 in the valve plate 68 always register with the passages 48 and accordingly provide for flow control therethrough as subsequently described.

Considering the functional aspect of certain apertures in the valve plates and referring first to FIG. 4 and the valve plate 58, the important apertures are those designated by the numerals 71, these being equispaced around the plate 58. From FIGS. 1 and 2, it will be apparent that the apertures 71 respectively register with the metering passages 65 and that regardless of the position of the valve plate 58, these metering passages will never be masked. For the valve plate 68, the critical apertures are those denoted by the numerals 72 which always respectively register with the metering passages 53 which are never masked whatever the position of the valve plate 68 may be.

The above assembly, referring to FIG. 1, is preferably enclosed in a housing 73 provided with bearings 74 and 75 for journal support of the shaft 10 which extends through an opening 76 in an end wall 77 of the housing, the opening 76 being closed by a cover 78 within which the adjacent end of the shaft 10 has a rotating, sealing fit. The cover 78 is slightly spaced from the adjacent shaft end to form a chamber 79 that provides communication between a port 80 in the cover 78 and the low pressure oil passage 46 that connects with the radial passage 45 leading to the pockets 44. Also connected to the passage 46 are radial passages 81 and 82 for supplying oil to the bearings 83 and 84 of the pinions 17 and 19, all respectively, so that the low pressure oil is the lube oil. The passages 49 and 61 at their ends opposite to the radial passages 50 and 62 communicate through radial passages 85 and 86 in the shaft 10 with pipes 87 and 88, all respectively, the latter pipes having their ends fastened to the cover 78 and connecting with the remainder of the hydraulic system that will now be described.

Referring to FIG. 8, the numeral 89 designates a conventional sump which may be provided by a lower part of the housing 73. The oil is withdrawn from the sump 89 by a suitably driven, positive displacement pump 90 and is discharged to a high pressure pipe 91 under the regulation imposed by a pressure regulating valve 93, the pipe 91 leading to a selector valve 92 which is shown in a position dictating the release of both clutches. By way of example, it will be assumed that the pressure in the pipe 91 is maintained at 110 p.s.i. which is the maximum engaging pressure for either clutch.

The bypass from the regulating valve 93 passes through a pipe 94 to the hydraulic torque converter 11 and thence through a pipe 95 to a pressure regulating valve 96 which is located in back pressuring relation to the regulating valve 93 to thereby establish in the converter an assumed pressure of 40 p.s.i. It will be understood that the converter 11 is not an essential feature of the invention. From the regulating valve 96, the oil flows through a pipe 97 and cooler 98 to one end of a low pressure pipe 99 under the regulation of a pressure regulating valve 100 positioned in back pressuring relation to the valve 96 to establish in the pipe 99 an assumed pressure of 10 p.s.i. Oil bypassed by the regulating valve 100 flows through a pipe 101 to the sump 89 and the opposite end of the low pressure pipe 99 connects through the port 80 (see FIG. 1) with the passage 46.

Considering the connections of the selector valve 92 which is generally of conventional type, the discharge end of the high pressure pipe 91 is shown masked by the valve and the selector valve ends of the pipes 87 and 88 then communicate with sump connecting pipes 102 and 103 so that the clutches 14 and 15 stand released as shown in FIG. 1.

In this condition, however, the chambers 31 and 32 are maintained full of oil at the assumed pressure of 10 p.s.i. in the following manner. This oil moving through the pipe 99 and thence successively through the passages 46 and 45 to the radial pockets 44 and connecting lateral passages 47 and 48 impinges on the solid portions 60 of the valve plate 58 and the solid portions 70 of the valve plate 68. The valve plates 58 and 68 are thus maintained in the outward positions shown in FIGS. 1, 3 and 7 and the chambers 31 and 32 are accordingly filled with oil at the indicated low pressure. Discharge of oil from the chambers 31 and 32 is through the metering passages 65 and 53, respectively, which passages are important in maintaining the desired low pressure, and thence at sump pressure through the associated recesses 64 and 52 and the connecting passages and chambers to the pipes 88 and 87, respectively, then connecting with the sump 89 (see FIG. 8).

To engage the clutch 15, the selector valve 92 is moved to the left to thereby connect the high pressure pipe 91 with the pipe 87 while maintaining through the valve 92 the connection of the pipes 88 and 103. This shift of the selector valve 92 does not affect flow through the pipe 99 which continuously supplies the low pressure oil.

Referring to FIGS. 1, 3 and 7, the high pressure oil passing through the pipe 87 flows successively through the passages 49 and 50 in the shaft 10 to the chamber 36 to thereby unbalance the axial forces hitherto acting on the assembly including the casing 28 and the pistons 29 and 30 which, for convenience, will now be denoted the piston assembly. This assembly therefore begins moving towards the right with an accompanying increase in the volume of the chamber 32 and a decrease in the volume of the chamber 31. During this phase of the operation, the high pressure oil also moves through the passages 51 into the recesses 52 and thence through the metering passages 53 into the chamber 32. An important aspect of the situation at this point is that the high pressure oil in the recesses 52 holds the carriers 54 and the associated valve plate 58 in the outward position shown in FIGS. 3 and 7 against the pressure created by the decreasing volume of the chamber 31 so that the passages 47 are uncovered.

As long as the chamber 32 increases in volume, the primary supply of oil thereto is effected by the low pressure oil since the only major resistance is that provided by the springs 40. This oil passes through the pipe 99 and thence successively through the passages 46 and 45, the pockets 44 and passages 48 to impinge on the solid portions 70 of the valve plate 68 which is thereby held in the outward positions shown in FIGS. 3 and 7. While some oil may be transferred from the chamber 31 to the expanding volume chamber 32 through the passage 47, pocket 44 and passage 48 at this time, the filling of the chamber 32 is primarily effected by the low pressure oil and this is a factor in securing rapid engagement. At the same time, oil is being discharged from the decreasing volume chamber 31, while still maintaining its filling, through the metering passages 65 (see FIG. 1), recesses 64, passages 63, chamber 35 and passages 62 and 61 to the pipe 88 which through the valve 92 connects with the sump pipe 103.

The foregoing operation continues until the piston 30 has bottomed the plates of the clutch 15 against the abutment ring 23 when movement of the piston assembly ceases. Since the chamber 32 has stopped increasing in volume and high pressure oil is being supplied through the metering passages 53, the pressure in the chamber 32 rises and acting against the valve plate 68 and its carriers 66 moves these parts to close the passages 48 by the valve plate 68. Pressure in the chamber 32 then rises to the maximum engaging value for the clutch 15. The chambers 31 and 32 are accordingly maintained filled with oil under the indicated condition.

To restore the mechanism to the clutch release positions shown in FIG. 1, the selector valve 92 is returned from its hitherto shifted position to the left to that shown in FIG. 8 whereupon the chamber 32 connects with the sump as already described, the chamber 31 having retained such connection, and the low pressure oil then resumes its control on the valve plates 58 and 68 and maintains them in the outward positions shown in FIGS. 1, 3 and 7 to permit flow into the chambers 31 and 32.

To engage the clutch 14, the selector valve 92 is moved to the right to connect the high pressure pipe 91 to the pipe 88, the pipe 87 and hence the chamber 32 retaining their connection with the sump 89. A comparable action to the described engagement of the clutch 15 then ensues. Briefly, the high pressure oil acting in the chamber 35 starts the piston assembly moving towards the left to increase the volume of the chamber 31 and to decrease the volume of the chamber 32. The ensuing action is similar to that described for the engagement of the clutch 15 except that the high pressure oil maintains the valve plate 68 in the outward shifted position and the valve plate 58 is shifted to the right to mask the passages 47 by the pressure rise in the chamber 31 when movement of the piston assembly in the indicated clutch engaging direction ceases.

Particular advantages of the mechanism are the mounting of the valving and metering features on the reaction member for controlling flow of oil into and out of the clutch chambers 31 and 32, the constant filling of these chambers as well as the chambers 35 and 36 regardless of the extent of their volumes, the constant supply of the low pressure oil which is a factor in rapid engagement due to the constant filling of the increasing volume chamber 31 or 32, and the absence of any necessity for the use of springs in controlling oil flow to or from the chambers 31 and 32.

I claim:

1. An hydraulically operated clutch mechanism comprising a pair of clutches having a common shaft and connected to separate parts, respectively, an annular casing shiftable on the shaft between and having end wall pistons adapted to engage the clutches, respectively, an annular reaction member within the casing held against axial movement on the shaft and defining with the casing a pair of variable volume, pressure liquid receiving chambers, means for constantly supplying liquid at a relatively low pressure to both chambers when both clutches are released including passage means in the reaction member connecting with and through which the low pressure liquid is supplied to both chambers and valve means carried by the reaction member on opposite sides thereof and biased by the low pressure liquid to positions enabling flow through the passage means.

2. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and defining with the casing a pair of variable volume, pressure liquid receiving chambers, the reaction member including a plurality of radial pockets circumferentially spaced around the shaft and passages connecting each pocket with the chambers, respectively, means for constantly supplying liquid at a relatively low pressure through the pockets to the chambers when both clutches are released, and valve means carried by the reaction member on opposite sides thereof and biased by the low pressure liquid to positions enabling flow through the passages.

3. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and defining with the casing a pair of variable volume, pressure liquid receiving chambers, the reaction member including a plurality of radial pockets circumferentially spaced around the shaft and passages connecting each pocket with the chambers, respectively, means for maintaining the filling of both chambers through the pockets with liquid at a relatively low pressure, and means for selectively supplying liquid at a relatively high pressure to either chamber for engaging the associated clutch including hydraulically actuated valve means carried by the reaction member and biased by the relatively high pressure liquid moving to the increasing volume chamber of the clutch being engaged to a position providing for discharge of the liquid from the decreasing volume chamber.

4. A mechanism as defined in claim 3 wherein the means for supplying the high pressure liquid includes a metering passage in the reaction member.

5. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and defining with the casing a pair of variable volume, pressure liquid receiving chambers, the reaction member including a plurality of radial pockets circumferentially spaced around the shaft and passages connecting each pocket with the chambers, respectively, means for constantly supplying liquid at a relatively low pressure through the pockets to the chambers when both clutches are released, two sets of recesses provided in and around the reaction member transversely thereof, the recesses in each set extending oppositely to the recesses of the other set, a piston carrier mounted in each recess and extending beyond the open end thereof, an annular valve plate in each chamber mounted on each set of carriers adjacent the passages in the reaction member and biased by the low pressure liquid to positions enabling low pressure flow to the chambers, respectively, when the clutches are released, and means for selectively supplying liquid at a relatively high pressure to either chamber to expand the volume thereof for engaging the associated clutch including passage means in the reaction member constituted partly by that set of recesses whose carriers extend into the decreasing volume chamber whereby said last named carriers and the valve plate mounted thereon are biased by the high pressure liquid to positions enabling partial escape of the liquid from the decreasing volume chamber.

6. A mechanism as defined in claim 5 wherein the high pressure passage means in the reaction member includes a metering passage interposed between the associated recess and the adjacent chamber.

7. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and defining with the casing a pair of variable volume, pressure liquid receiving chambers, the reaction member including a plurality of radial pockets circumferentially spaced around the shaft and passages connecting each pocket with the chambers, respectively, means for constantly supplying liquid at a relatively low pressure through the pockets to the chambers when both clutches are released, two sets of recesses provided in and around the reaction member transversely thereof, the recesses in each set extending oppositely to the recesses of the other set, a piston carrier mounted in each recess and extending beyond the open end thereof, an annular valve plate in each chamber mounted on each set of carriers adjacent the passages in the reaction member and biased by the low pressure liquid to positions enabling low pressure flow to the chambers, respectively, when the clutches are released, a pair of separate passage means in the reaction member, each passage means through one set of recesses connecting with the chambers, respectively, and means for selectively supplying liquid at a relatively high pressure through either of said separate passage means to expand the volume of the associated chamber for engaging the associated clutch whereby the carriers which extend into the decreasing volume chamber and the valve plate mounted on said last named carriers are biased by the high pressure liquid to positions enabling partial escape through said passages of the liquid from the decreasing volume chamber.

8. A mechanism as defined in claim 7 wherein each separate passage means in the reaction member includes a metering passage interposed between the associated recess and the adjacent chamber.

9. A mechanism as defined in claim 7 wherein the shaft includes three longitudinal duct means, one duct means constantly supplying low pressure liquid to the pockets in the reaction member, and the other two duct means communicating respectively with said passage means in the reaction member.

10. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and having oppositely extending annular flanges surrounding the shaft, a first pair of variable volume chambers radially outward of the flanges and included therebetween, the casing and reaction member, a second pair of variable volume chambers radially inward of the flanges and included therebetween, the casing and shaft, the chambers on opposite sides of the reaction member being partly defined by the pistons, respectively, and associated with a clutch, means for constantly supplying liquid at a relatively low pressure to the outer chambers when both clutches are released including passage means in the reaction member connecting with and through which the low pressure liquid is supplied to the outer chambers and valve means carried by the reaction member on opposite sides thereof and biased by the low pressure liquid to positions enabling flow through the passage means, and means for selectively supplying liquid at a relatively high pressure to the inner and outer chambers on one side of the reaction member to engage the associated clutch including hydraulically actuated valve means carried by the reaction member and biased by the relatively high pressure liquid moving to the increasing volume chamber of the clutch being engaged to a position providing for discharge of the liquid from the decreasing volume chamber.

11. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and having oppositely extending annular flanges surrounding the shaft, a first pair of variable volume chambers radially outward of the flanges and included therebetween, the casing and reaction member, a second pair of variable volume chambers radially inward of the flanges and included therebetween, the casing and shaft, the chambers on opposite sides of the reaction member being partly defined by the pistons, respectively, and associated with a clutch, the reaction member including a plurality of radial pockets circumferentially spaced around the shaft and passages connecting each pocket with the outer chambers, respectively, means for constantly supplying liquid at a relatively low pressure through the pockets to the outer chambers when both clutches are released, two sets of recesses provided in and around the reaction member transversely thereof and outwardly of the annular flanges, respectively, the recesses in each set extending oppositely to the recesses of the other set, a piston carrier mounted in each recess and extending beyond the open end thereof into the associated outer chamber, an annular valve plate in each outer chamber mounted on a set of carriers adjacent the passages in the reaction member and biased by the low pressure flow to enable flow through the passages to the outer chambers, respectively, when the clutches are released, and means for selectively supplying liquid at a relatively high pressure to either inner chamber to expand the volume thereof and of the outer chamber on the same side of the reaction member, each inner and outer chamber on the same side of the reaction member being connected by passage means in the reaction member constituted partly by that set of recesses whose carriers extend into the decreasing volume outer chamber whereby said last named carriers and the valve plate mounted thereon are biased by the high pressure liquid to positions enabling partial escape of the liquid from the decreasing volume outer chamber.

12. A mechanism as defined in claim 11 wherein the passage means in the reaction member includes a metering passage interposed between the associated recess and the adjacent outer chamber.

13. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and having oppositely extending annular flanges surrounding the shaft, a first pair of variable volume chambers radially outward of the flanges and included therebetween, the casing and reaction member, a second pair of variable volume chambers radially inward of the flanges and included therebetween, the casing and shaft, the chambers on opposite sides of the reaction member being partly defined by the pistons, respectively, and associated with a clutch, the reaction member including a plurality of radial pockets circumferentially spaced around the shaft and passages connecting each pocket with the outer chambers, respectively, means for constantly supplying liquid at a relatively low pressure through the pockets to the outer chambers when both clutches are released, two sets of recesses provided in and around the reaction member transversely thereof and outwardly of the annular flanges, respectively, the recesses in each set extending oppositely to the recesses of the other set, a piston carrier mounted in each recess and extending beyond the open end thereof into the associated outer chamber, an annular valve plate in each outer chamber mounted on a set of carriers adjacent the passages in the reaction member and biased by the low pressure flow to enable flow through the passages to the outer chambers, respectively, when the clutches are released, separate passage means in the reaction member, each passage means through one set of recesses connecting the inner and outer chambers on one side of the reaction member, and means for selectively supplying liquid at a relatively high pressure to either inner chamber and thence through the associated passage means and recesses to the outer chamber on the same side of the reaction member to thereby expand the volumes of said last named chambers and engage the associated clutch and to decrease the volumes of the inner and outer chambers on the opposite side of the reaction member whereby the carriers which extend into the decreasing volume outer chamber and the valve plate mounted on said last named carriers are biased by the high pressure liquid to positions enabling partial escape through said passage means of the liquid from the decreasing volume outer chamber.

14. A mechanism as defined in claim 13 wherein each separate passage means in the reaction member includes a metering passage interposed between the associated recess and the adjacent outer chamber.

15. A mechanism as defined in claim 13 wherein the shaft includes three longitudinal duct means, one duct means constantly supplying low pressure liquid to the pockets in the reaction member, and the other duct means communicating respectively with said passage means in the reaction member.

16. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and having oppositely extending annular flanges surrounding the shaft, a first pair of variable volume chambers radially outward of the flanges and included therebetween, the casing and reaction member, a second pair of variable volume chambers radially inward of the flanges and included therebetween, the casing and the shaft, the chambers on opposite sides of the reaction member being partly defined by the pistons, respectively, and associated with a clutch, means for constantly supplying liquid at a relatively low pressure to the outer chambers when both clutches are released including first passage means in the reaction member connecting with and through which the low pressure liquid is supplied to the outer chambers and valve means carried by the reaction member on opposite sides thereof and biased by the low pressure liquid to positions enabling flow through the first passage means, means for selectively supplying relatively high pressure liquid to one of the inner chambers to start the annular casing moving in a direction to engage the associated clutch and to thereby increase the volumes of said one inner chamber and the outer chamber on the same side of the reaction member while the corresponding chambers on the opposite side of the reaction member decrease in volume, means for maintaining the low pressure liquid supply to the increasing volume outer chamber to maintain its filling and to hold the valve means in the increasing volume chamber open, and second passage means in the reaction member connecting each inner chamber with the outer chamber on the same side of the reaction member and having an operating relation to the valve means in the outer chambers such that the high pressure liquid flowing through one second passage means to the increasing volume outer chamber biases to an open position the valve means in the decreasing volume outer chamber to provide for partial discharge from said last named chamber to the other second passage means.

17. An hydraulically operated clutch mechanism comprising a pair of clutches having a common shaft and connected to separate rotary parts, respectively, an annular casing shiftable on the shaft between and having end wall pistons adapted to engage the clutches, respectively, an annular reaction member within the casing held against axial movement on the shaft and defining with the casing a pair of variable volume, pressure liquid receiving chambers, means for maintaining the filling of both chambers with liquid at a relatively low pressure when both clutches are released including passage means in the reaction member connecting with and through which the low pressure liquid is supplied to both chambers, and means for selectively supplying liquid at a relatively high pressure to either chamber for engaging the associated clutch including hydraulically actuated valve means carried by the reaction member and biased by the relatively high pressure liquid moving to the increasing volume chamber of the clutch being engaged to a position providing for discharge of the liquid from the decreasing volume chamber.

References Cited in the file of this patent

UNITED STATES PATENTS

| 2,464,538 | Vanderzee | Mar. 15, 1949 |
| 2,632,544 | Hockert | Mar. 24, 1953 |
| 2,825,236 | Nabstedt et al. | Mar. 4, 1958 |
| 2,868,341 | Snoy | Jan. 13, 1959 |
| 2,920,732 | Richards et al. | Jan. 12, 1960 |